United States Patent
Ma

(10) Patent No.: US 12,120,112 B2
(45) Date of Patent: Oct. 15, 2024

(54) ADDRESS INFORMATION OBTAINING METHOD AND APPARATUS

(71) Applicant: HUAWEI TECHNOLOGIES CO., LTD., Guangdong (CN)

(72) Inventor: Jingwang Ma, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 906 days.

(21) Appl. No.: 17/117,985

(22) Filed: Dec. 10, 2020

(65) Prior Publication Data

US 2021/0099445 A1    Apr. 1, 2021

Related U.S. Application Data

(63) Continuation of application No. PCT/CN2019/090757, filed on Jun. 11, 2019.

(30) Foreign Application Priority Data

Jun. 11, 2018  (CN) .......................... 201810596707.1

(51) Int. Cl.
  *H04L 9/40*       (2022.01)
  *H04L 12/28*      (2006.01)
  *H04L 61/5014*    (2022.01)

(52) U.S. Cl.
  CPC ...... *H04L 63/0876* (2013.01); *H04L 12/2874* (2013.01); *H04L 61/5014* (2022.05); *H04L 63/20* (2013.01)

(58) Field of Classification Search
  CPC . H04L 63/0876; H04L 63/20; H04L 61/5014; H04L 12/2874
  See application file for complete search history.

(56) References Cited

U.S. PATENT DOCUMENTS

| | | | |
|---|---|---|---|
| 2017/0003259 A1 | 1/2017 | Hunter | |
| 2019/0166001 A1* | 5/2019 | Ma | H04L 41/122 |

(Continued)

FOREIGN PATENT DOCUMENTS

| | | | |
|---|---|---|---|
| CN | 106341832 A | 1/2017 | |
| CN | 107872345 A | 4/2018 | |

(Continued)

OTHER PUBLICATIONS

Telecom Italia, "23.502: Improvements to NFs discovery", SA WG2 Meeting #122bis, S2-175606, Aug. 21-25, 2017, Sophia Antipolis, France, total 4 pages.

(Continued)

*Primary Examiner* — Dhairya A Patel
(74) *Attorney, Agent, or Firm* — WOMBLE BOND DICKINSON (US) LLP

(57) ABSTRACT

Address information obtaining methods and apparatuses are described. It is determined that a network element that supports a type of a first NF and that is in a first network slice needs to be accessed. The type of the first NF and information about the first network slice is sent to a network repository network element to obtain address information of the network element that supports the type of the first NF and is in the first network slice. Address information of a first network element is received from the network repository network element. The first network element is the network element that supports the type of the first NF and that is in the first network slice. A terminal can obtain the address information of the network element that supports the type of the first NF and that is in the first network slice.

17 Claims, 5 Drawing Sheets

(56) References Cited

U.S. PATENT DOCUMENTS

| | | | |
|---|---|---|---|
| 2019/0306251 A1* | 10/2019 | Talebi Fard | H04W 76/10 |
| 2020/0187088 A1* | 6/2020 | Chun | H04W 48/02 |
| 2020/0296660 A1* | 9/2020 | Wang | H04W 48/16 |
| 2023/0300027 A1* | 9/2023 | Singh | H04L 41/0853 |
| | | | 709/225 |
| 2023/0300611 A1* | 9/2023 | Accad | H04W 12/06 |
| | | | 726/4 |
| 2024/0098823 A1* | 3/2024 | Han | H04W 76/15 |

FOREIGN PATENT DOCUMENTS

| | | | |
|---|---|---|---|
| CN | 107888425 A | | 4/2018 |
| WO | 2017012402 A1 | | 1/2017 |
| WO | PCTCN2016092723 | * | 8/2017 |
| WO | WO2018023338 | * | 8/2017 |
| WO | WO20188023338 | * | 8/2017 |
| WO | 2017161484 A1 | | 9/2017 |
| WO | 2018093168 A1 | | 5/2018 |
| WO | WO2019193129 | * | 10/2019 |

OTHER PUBLICATIONS

Nokia, Alcatel-Lucent Shanghai Bell, Verizon, ATandT, Pseudo-CR on NF Service Discovery and Selection Requirements. 3GPP TSG CT4 Meeting #79, Krakow, Poland; Aug. 21-25, 2017, C4-174233, 4 pages.

Nokia, Alcatel-Lucent Shanghai Bell, On NSI and Network Function Selection in Network Slicing environment. SA WG2 Meeting #122, Jun. 26-30, 2017, san Jose Del Cabo, Mexico, S2-174674, 3 pages.

* cited by examiner ial Application No.
ADDRESS INFORMATION OBTAINING METHOD AND APPARATUS

CROSS-REFERENCE TO RELATED APPLICATIONS

This application is a continuation of International Application No. PCT/CN2019/090757, filed on Jun. 11, 2019, which claims priority to Chinese Patent Application No. 201810596707.1, filed on Jun. 11, 2018. The disclosures of the aforementioned applications are hereby incorporated by reference in their entireties.

TECHNICAL FIELD

The application relates to the field of mobile communications technologies, and in particular, to an address information obtaining method and an apparatus.

BACKGROUND

In a current network architecture, a plurality of network slices are obtained through division from a common network infrastructure of a core network based on a technology such as virtualization, and the network slices are used to implement a network service required by a specific service or some services. To indicate a network slice of a specific type, information about the network slice may include a corresponding type of the network slice, and the type of the network slice includes, for example, an enhanced mobile broadband (eMBB) type or an ultra low latency type.

In a next-generation communications network, network functions (NFs) may be deployed in different network slices. To implement isolation between the network slices, a terminal is allowed to access only some or all network functions that the terminal is allowed to access in a network slice. For example, if the terminal is allowed to access the network slice of the eMBB type, the terminal may access a network function that is deployed in the network slice of the eMBB type and that is allowed to be accessed by the terminal. However, currently, there is no corresponding solution to how the terminal obtains an address of a network element that supports a network function that the terminal needs to access.

SUMMARY

The application provides an address information obtaining method and an apparatus, to provide a terminal with an address of a network function network element that is in a network slice and that the terminal needs to access.

In an embodiment, the application provides an address information obtaining method. A first terminal determines that a network element that supports a type of a first NF and that is in a first network slice needs to be accessed. The first terminal sends the type of the first NF and information about the first network slice to a network repository network element, to obtain address information of the network element that supports the type of the first NF and that is in the first network slice. The first terminal receives address information of a first network element from the network repository network element, where the first network element is the network element that supports the type of the first NF and that is in the first network slice. Based on this solution, the first terminal can request, from the network repository network element, to obtain the address information of the network element that supports the type of the first NF and that is in the first network slice, so that the first terminal can access the network element.

In an embodiment, the information about the first network slice includes network slice selection assistance information.

In an embodiment, the first terminal may further initiate a registration procedure based on the address information of the first network element.

In an embodiment, the first terminal may send a type of a network function repository function (NRF) to a dynamic host configuration protocol (DHCP) server, to obtain a network element that supports the type of the NRF. The first terminal receives address information of the network repository network element from the DHCP server. That the first terminal sends the type of the first NF and information about the first network slice to a network repository network element includes: The first terminal sends the type of the first NF and the information about the first network slice to the network repository network element based on the address information of the network repository network element. Based on this solution, the first terminal can obtain the address information of the network repository network element from the DHCP server.

In an embodiment, that the first terminal sends the type of the NRF to the DHCP server, to obtain the network element that supports the type of the NRF includes: The first terminal sends the type of the NRF and the information about the first network slice to the DHCP server, to obtain the network element that supports the type of the NRF and that is in the first network slice. Based on this solution, the first terminal can obtain the address information of the network repository network element from the DHCP server, and the network repository network element belongs to the first network slice.

In an embodiment, the application provides an address information obtaining method. The method includes: A network repository network element receives a type of a first NF and information about a first network slice that are from a first terminal. The network repository network element determines to allow the first terminal to access a network element that supports the type of the first NF and that is in the first network slice. The network repository network element obtains address information of a first network element, where the first network element is the network element that supports the type of the first NF and that is in the first network slice. The network repository network element sends the address information of the first network element to the first terminal. Based on this solution, the network repository network element can send, to the first terminal based on a request from the first terminal, address information of the network element that supports the type of the first NF and that is in the first network slice, so that the first terminal can access the network element.

In an embodiment, that the network repository network element determines to allow the first terminal to access a network element that supports the type of the first NF and that is in the first network slice includes: The network repository network element sends an identifier of the first terminal and a subscription data type to a data management network element, to request to obtain subscription data, corresponding to the subscription data type, of the first terminal. The network repository network element receives the subscription data of the first terminal from the data management network element. The subscription data includes information about a network slice that is accessible by the first terminal and a type of an NF that is accessible by the first terminal and that is in the network slice. If the information about the network slice that is accessible by the first terminal includes the information about the first network slice, and the type of the NF that is accessible by the first terminal and that is in the network slice includes the type of the first NF, the network repository network element determines to allow the first terminal to access the network element that supports the type of the first NF and that is in the first network slice.

In another embodiment, that the network repository network element determines to allow the first terminal to access a network element that supports the type of the first NF and that is in the first network slice includes: The network repository network element determines, based on preset policy information, a type of an NF that is allowed to be accessed by the first terminal and that is in the first network slice. If the type of the NF that is allowed to be accessed by the first terminal and that is in the first network slice includes the type of the first NF, the network repository network element determines to allow the first terminal to access the network element that supports the type of the first NF and that is in the first network slice.

In another embodiment, that the network repository network element determines to allow the first terminal to access a network element that supports the type of the first NF and that is in the first network slice includes: The network repository network element determines, based on preset policy information, that the first NF in the first network slice is allowed to be accessed by the first terminal.

In an embodiment, the information about the first network slice includes network slice selection assistance information.

In an embodiment, the network repository network element receives a registration request message from the first network element. The registration request message includes the type of the first NF, the information about the first network slice, the address information of the first network element, and access configuration information of the first network element. The access configuration information is used to indicate whether the first network element is allowed to be accessed by the first terminal. The network repository network element stores the type of the first NF, the information about the first network slice, the address information of the first network element, and the access configuration information of the first network element. Based on this solution, the first network element can register information related to the first network element with the network repository network element.

In an embodiment, the application provides a registration method. The method includes: A first network element sends a registration request message to a network repository network element. The registration request message includes information about a first network slice, a type of a first NF, address information of the first network element, and access configuration information of the first network element. Based on this solution, the first network element can register information related to the first network element with the network repository network element.

In an embodiment, the first network element may further receive a registration response message from the network repository network element. The registration response message is used to notify the first network element whether the registration succeeds or fails.

In an embodiment, the application provides a registration method. The method includes: A network repository network element receives a registration request message from a first network element. The registration request message includes information about a first network slice, a type of a first NF, address information of the first network element, and access configuration information of the first network element. The network repository network element stores the information about the first network slice, the type of the first NF, the address information of the first network element, and the access configuration information of the first network element. Based on this solution, the first network element can register information related to the first network element with the network repository network element.

In an embodiment, the network repository network element may further send a registration response message to the first network element. The registration response message is used to notify the first network element whether the registration succeeds or fails.

In an embodiment, the application provides an apparatus. The apparatus may be a network repository network element, a first network element, or a terminal, or may be a chip. The apparatus has a function of implementing embodiments described herein. The function may be implemented by hardware, or may be implemented by hardware executing corresponding software. The hardware or the software includes one or more modules corresponding to the foregoing function.

In an embodiment, an apparatus is provided, and includes a processor and a memory. The memory is configured to store a computer-executable instruction. When the apparatus runs, the processor executes the computer-executable instruction stored in the memory, so that the apparatus performs the address information obtaining method according to embodiments described herein, the apparatus performs the registration method according to embodiments described herein.

In an embodiment, the application further provides a computer-readable storage medium. The computer-readable storage medium stores an instruction, and when the instruction is run on a computer, the computer is enabled to perform the methods according to the foregoing aspects.

In an embodiment, the application further provides a computer program product including an instruction. When the computer program product runs on a computer, the computer is enabled to perform the methods described herein.

In an embodiment, the application further provides a system. The system includes the network repository network element according to embodiments described herein and the data management network element according to embodiments described herein. Optionally, the system may further include the first terminal according to embodiments described herein.

In an embodiment, the application further provides a system. The system includes the network repository network element according to embodiments described herein and the first network element according to embodiments described herein.

These aspects or other aspects in the application may be clearer and more intelligible in descriptions in the following embodiments.

DESCRIPTION OF EMBODIMENTS

The following further describes in detail the application with reference to accompanying drawings. A specific operation method in a method embodiment may also be applied to an apparatus embodiment or a system embodiment. In the descriptions of the application, unless otherwise stated, "a plurality" means two or more.

A network architecture and a service scenario described in embodiments of the application are intended to describe the technical solutions in embodiments of the application more clearly, and do not constitute a limitation on the technical solutions provided in embodiments of the application. A person of ordinary skill in the art may know that: With evolution of the network architecture and emergence of a new service scenario, the technical solutions provided in embodiments of the application are also applicable to similar technical problems.

Figure 1:
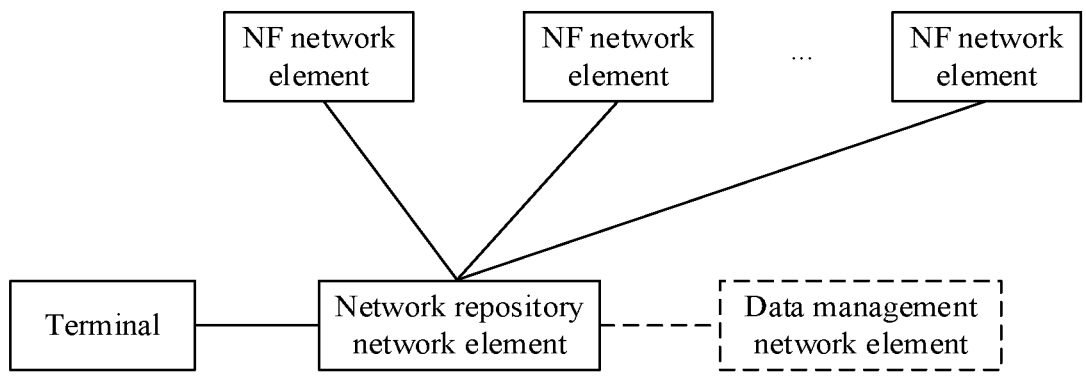
FIG. 1 is a schematic diagram of a possible network architecture according to an embodiment of the application.

FIG. 1 is a schematic diagram of a network architecture according to an embodiment of the application. The network architecture includes a network repository network element and one or more NF network elements. Optionally, the network architecture further includes a data management network element. Optionally, the network architecture further includes a terminal.

The terminal may request, to the network repository network element, to obtain address information of a network element that supports a specific network function and that is in a specific network slice. Then, the terminal accesses the network element by using the address information.

The terminal is a device having a wireless communication function, and may be deployed on land, including an indoor device, an outdoor device, a handheld device, or a vehicle-mounted device, or may be deployed on a water surface (e.g., a ship), may be deployed in the air (for example, on an aircraft, a balloon, or a satellite). The terminal may be a mobile phone, a tablet (pad), a computer having a wireless sending and receiving function, a virtual reality (virtual reality, VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like; or may be user equipment (UE), mobile stations (MS), or terminal devices in various forms.

The network repository network element has a network function discovery capability. In the application, the network repository network element may be configured to discover a network function supported by a network slice. The network repository network element may be an NRF network element in a 5th generation (5G) network. In a future communications network such as a 6th generation (6G) network, the network repository network element may further have another name. This is not limited in the application.

The NF network element is a network element that has a specific network function. For example, the NF network element may be a user plane connection function (UCF) network element, a proximity communication service (ProSe) network element, a location management function (LMF) network element, a group communication service (GCSE) network element, a broadcast/multicast service center (Broadcast Multicast Service Center, BMSC) network element, an access and mobility management function (AMF) network element, a session management function (SMF) network element, and the like.

The data management network element is mainly configured to store user data, such as subscription information and authentication/authorization information. In 5G, the data management network element may be a unified data management (UDM) network element. In future communication such as 6G, the data management network element may still be a UDM network element or may have another name. This is not limited in the application.

It may be understood that the foregoing functions may be network elements in a hardware device, may be software functions running on dedicated hardware, or may be virtualized functions instantiated on a platform (for example, a cloud platform).

For ease of description, an example in which the network repository network element is an NRF network element and the data management network element is a UDM network element is used for description below in the application. For ease of description, further, the NRF network element is referred to as NRF for short, and the UDM network element is referred to as UDM for short. It may be understood that the NRF in the following description may be replaced with the network repository network element, and the UDM may be replaced with the data management network element. A unified description is provided herein, and details are not described below.

Figure 2:
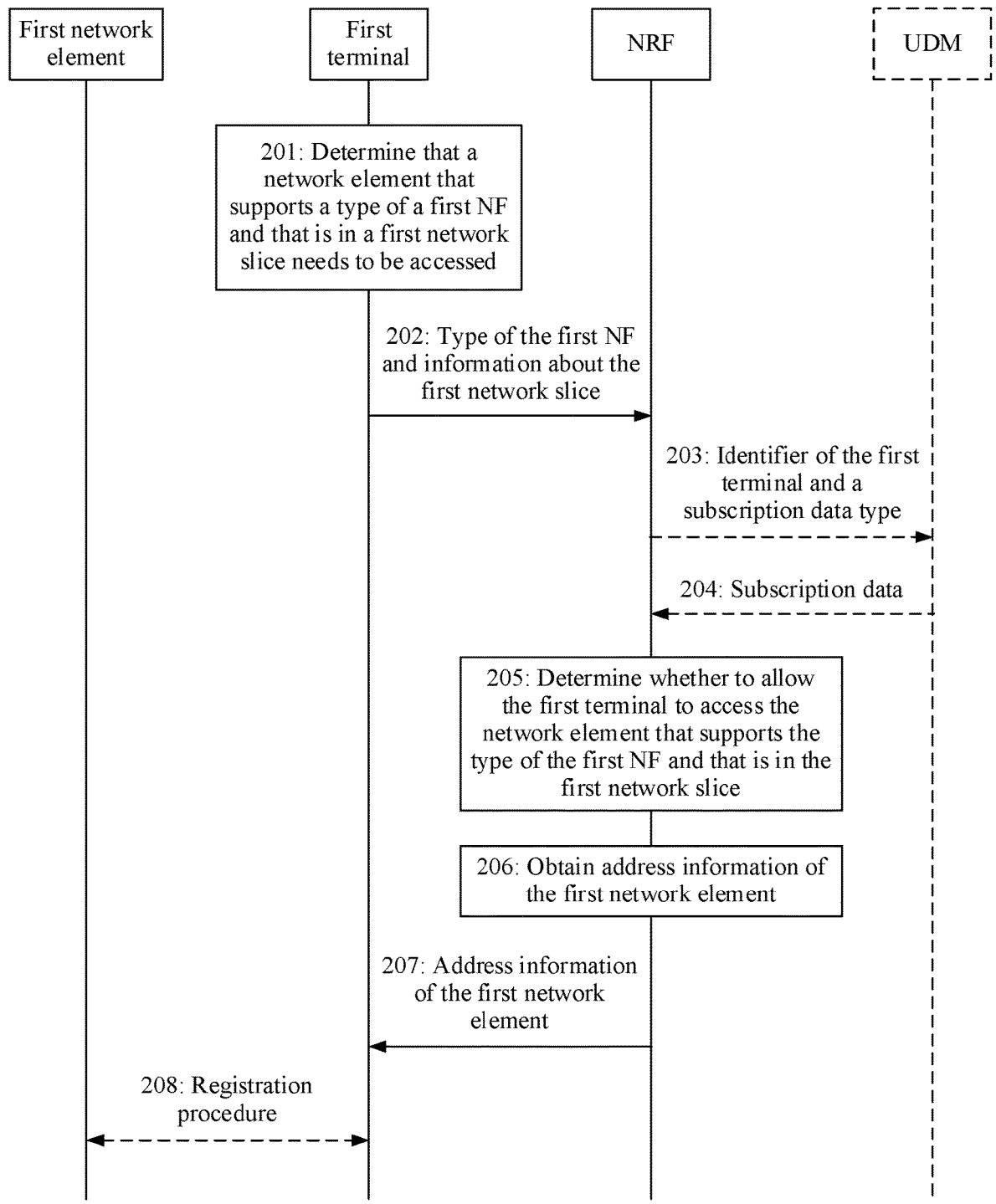
FIG. 2 is a flowchart of an address information obtaining method according to an embodiment of the application.

FIG. 2 shows an address information obtaining method according to an embodiment of the application. In an embodiment shown in FIG. 2, a first terminal is used as an example for description, and the first terminal may be the terminal shown in FIG. 1. The method includes the following operations.

Operation 201: The first terminal determines that a network element that supports a type of a first NF and that is in a first network slice needs to be accessed.

Operation 202: The first terminal sends the type of the first NF and information about the first network slice to an NRF, and correspondingly, the NRF may receive the type of the first NF and the information about the first network slice.

The information about the first network slice may include network slice selection assistance information. For example, the network slice selection assistance information may be single network slice selection assistance information (S-NSSAI). The S-NSSAI is used to identify a network slice.

The information about the first network slice in the first terminal may be obtained in the following manner: An identifier of a network slice that is accessible by the first terminal is preconfigured in the first terminal. In addition, a network may also update information that is in the first terminal and that is about the network slice that is accessible by the first terminal. For example, an AMF network element sends updated configuration information to the first terminal through a control plane connection to the first terminal, and the first terminal stores the updated information about the network slice that is accessible by the first terminal.

The first terminal sends the type of the first NF and information about the first network slice to the NRF, to request to obtain address information of the network element that supports the type of the first NF and that is in the first network slice. In the application, the network element that supports the type of the first NF and that is in the first network slice may be referred to as a first network element.

Therefore, it may also be understood as that, the first terminal sends the type of the first NF and the information about the first network slice to the NRF, to request to obtain address information of the first network element.

For example, if the first network slice is a network slice 1, and the type of the first NF is an SMF, that is, the first terminal determines that an SMF network element in the network slice 1 needs to be accessed, the first terminal may send information about the network slice 1 and the SMF to the NRF, to request to obtain address information of the SMF network element in the network slice 1.

It should be noted that, before the foregoing operation 202, the first terminal may first establish a connection to the NRF.

In an embodiment, the first terminal may pre-store address information of the NRF. Therefore, the first terminal may establish the connection to the NRF by using the address information of the NRF.

In another embodiment, the first terminal may further send a type of the NRF to a DHCP server, to request to obtain a network element that supports the type of the NRF. Then, the DHCP server obtains, based on the received type of the NRF, address information of the network element that supports the type of the NRF, that is, obtains address information of the NRF network element, and then, sends the obtained address information of the NRF network element to the first terminal. Further, the first terminal may establish, based on the received address information of the NRF network element, the connection to the NRF network element. It may be understood that the NRF can serve an entire PLMN.

In another embodiment, the first terminal may further send a type of the NRF and the information about the first network slice to a DHCP server, to request to obtain a network element that supports the type of the NRF and that is in the first network slice. Then, the DHCP server obtains, based on the received information about the first network slice and the received type of the NRF, address information of the network element that supports the type of the NRF and that is in the first network slice, that is, obtains address information of the NRF network element, and then, sends the obtained address information of the NRF network element to the first terminal. Further, the first terminal may establish, based on the received address information of the NRF network element, the connection to the NRF network element. It may be understood that, in this case, the NRF may serve the first network slice. Certainly, the NRF may further serve one or more other network slices.

Operation 205: The NRF determines whether to allow the first terminal to access the network element that supports the type of the first NF and that is in the first network slice.

After receiving the type of the first NF and the information about the first network slice that are sent by the first terminal, the NRF needs to determine, based on the type of the first NF and the information about the first network slice, whether to allow the first terminal to access the network element that supports the type of the first NF and that is in the first network slice. If the access is allowed, perform operation 206 to operation 208. If the access is not allowed, end the procedure. Alternatively, the NRF sends a failure indication to the first terminal, to indicate that the address information of the network element that supports the type of the first NF and that is in the first network slice fails to be obtained.

In an example, two implementations of determining, by the NRF, whether to allow the first terminal to access the network element that supports the type of the first NF and that is in the first network slice are provided below.

According to a first implementation, the NRF determines, based on preset policy information, whether the first terminal can access the network element that supports the type of the first NF and that is in the first network slice.

The NRF stores information about a network slice, a type of an NF in the network slice, address information of a network element that supports the type of the NF, and access configuration information of the network element that supports the type of the NE The access configuration information is used to indicate whether the first terminal is allowed to access the network element that supports the type of the NF. With reference to a specific example, the following uses a table form as an example for description.

Table 1 shows the related information of the network slice stored in the NRF.

TABLE 1

| Information about a network slice | Supported type of an NF | Address information of a network element that supports the type of the NF | Access configuration information |
|---|---|---|---|
| S-NSSAI 1 | NF 1 | IP 1 | Allowed to be accessed by a terminal |
| | NF 1 | IP 7 | Allowed to be accessed by a terminal |
| | NF 2 | IP 2 | Allowed to be accessed by a terminal |
| | NF 3 | IP 3 | Not allowed to be accessed by the terminal |
| S-NSSAI 2 | NF 1 | IP 4 | Not allowed to be accessed by the terminal |
| | NF 2 | IP 5 | Allowed to be accessed by a terminal |
| | NF 4 | IP 6 | Allowed to be accessed by a terminal |

Based on the example shown in Table 1, the information about the network slice 1 includes identification information of the network slice 1, and the identification information is S-NSSAI 1. Types of an NF supported by the network slice 1 include an NF 1, an NF 2, and an NF 3. Address information of network elements that support the NF 1 is an IP 1 and an IP 7 (for example, a plurality of network elements support the NF 1, and address information of the plurality of network elements is the IP 1 and the IP 7 respectively). Address information of a network element that supports the NF 2 is an IP 2. Address information of a network element that supports the NF 3 is an IP 3. In addition, the network elements that support the NF 1 and the network element that supports the NF 2 are allowed to be accessed by the terminal, and the network element that supports the NF 3 is not allowed to be accessed by the terminal. Alternatively, it may be understood as that the NF 1 and the NF 2 in the network slice 1 are allowed to be accessed by the terminal, and the NF 3 in the network slice 1 is not allowed to be accessed by the terminal. Information about a network slice 2 includes identification information of the network slice 2, and the identification information is S-NSSAI 2. Types of an NF supported by the network slice 2 include the NF 1, the NF 2, and an NF 4. Address information of a network element that supports the NF 1 is the IP 1. The address information of the network element that supports the NF 2 is the IP 2. Address information of a network element that supports the NF 4 is an IP 4. In addition, the network element that supports the NF 2 and the network element that supports the NF 4 are allowed to be accessed by the terminal, and the network element that supports the NF 1 is not allowed to be accessed by the terminal. Alternatively, it may be understood as that the NF 2 and the NF 4 in the network slice 2 are allowed to be accessed by the terminal, and the NF 1 in the network slice 2 is not allowed to be accessed by the terminal.

IP is short for Internet Protocol.

It should be noted that "allowed to be accessed by a terminal" in Table 1 means being allowed to be accessed by any terminal, or it is understood as being allowed to be accessed by all terminals. "Not allowed to be accessed by the terminal" in Table 1 means that any terminal is not allowed to access, or it is understood as that none of the terminals is allowed to access.

Therefore, in the first implementation, after receiving the information about the first network slice and the type of the first NF that are sent by the first terminal, the NRF may first determine, based on the preset policy information (for example, based on the information stored in Table 1), a type of an NF that is allowed to be accessed by the first terminal and that is in the first network slice. Further, if the type of the NF that is allowed to be accessed by the first terminal and that is in the first network slice includes the type of the first NF, the first terminal is allowed to access the network element that supports the type of the first NF and that is in the first network slice. If the type of the NF that is allowed to be accessed by the first terminal and that is in the first network slice does not include the type of the first NF, the first terminal is not allowed to access the network element that supports the type of the first NF and that is in the first network slice.

The following provides an example for description with reference to Table 1.

For example, if the type of the first NF sent by the first terminal in operation 202 is the NF 1, the information about the first network slice is the S-NSSAI 1. The NRF may determine, based on Table 1, that the types of the NF that is allowed to be accessed by the first terminal and that is in the network slice 1 include the NF 1 and the NF 2. Because the type of the NF that is allowed to be accessed by the first terminal includes the type of the first NF (NF 1), the NRF may determine to allow the first terminal to access the NF 1 in the network slice 1. Alternatively, it may be understood as that the NRF determines to allow the first terminal to access the network elements that support the NF 1 in the network slice 1.

For another example, if the type of the first NF sent by the first terminal in operation 202 is the NF 1, the information about the first network slice is the S-NSSAI 2. The NRF may determine, based on Table 1, that the types of the NF that is allowed to be accessed by the first terminal and that is in the network slice 2 include the NF 2 and the NF 4. Because the type of the NF that is allowed to be accessed by the first terminal does not include the type of the first NF (NF 1), the NRF may determine not to allow the first terminal to access the NF 1 in the network slice 2. Alternatively, it may be understood as that the NRF determines not to allow the first terminal to access the network element that supports the NF 1 in the network slice 2.

In another implementation, after receiving the information about the first network slice and the type of the first NF that are sent by the first terminal, the NRF may further determine, based on the preset policy information (for example, based on the information stored in Table 1), whether the first NF in the first network slice is allowed to be accessed.

For example, if the type of the first NF sent by the first terminal in operation 202 is the NF 1, the information about the first network slice is the S-NSSAI 1. The NRF may find, by using the S-NSSAI 1 and the NF 1 based on Table 1, that the corresponding access configuration information is "allowed to be accessed by the terminal". Therefore, the NRF may determine that the NF 1 in the network slice 1 is allowed to be accessed by the first terminal.

For another example, if the type of the first NF sent by the first terminal in operation 202 is the NF 1, the information about the first network slice is the S-NSSAI 2. The NRF may find, by using the S-NSSAI 2 and the NF 1 based on Table 1, that the corresponding access configuration information is "not allowed to be accessed by the terminal". Therefore, the NRF may determine that the NF 1 in the network slice 1 is not allowed to be accessed by the first terminal.

According to the foregoing method, the NRF can determine whether to allow the first terminal to access the network element that supports the type of the first NF and that is in the first network slice.

In an embodiment, the related information of the network slice that is stored in the NRF and that is shown in Table 1 may be actively registered with the NRF by the network element that supports the type of the NF. For example, for the first network element that supports the first NF and that is in the first network slice, the first network element sends a registration request message to the NRF. The registration request message includes the type of the first NF, the information about the first network slice, the address information of the first network element, and access configuration information of the first network element. The access configuration information is used to indicate whether the first network element is allowed to be accessed by the first terminal. Then, the NRF stores the type of the first NF, the information about the first network slice, the address information of the first network element, and the access configuration information of the first network element. In this way, the first network element is registered with the NRF, so that the NRF can subsequently determine, based on the locally stored related information of the network slice, whether to allow the first terminal to access the network element that supports the type of the first NF and that is in the first network slice. Herein, the related information of network slice stored in the NRF (for example, as shown in Table 1) may also be referred to as the preset policy information.

A second implementation includes the following operation 203 and operation 204.

In an embodiment, after operation 202 and before operation 205, the method further includes operation 203 and operation 204.

Operation 203: The NRF sends an identifier of the first terminal and a subscription data type to UDM. Correspondingly, the UDM may receive the identifier of the first terminal and the subscription data type.

The NRF sends the identifier of the first terminal and the subscription data type, to request to obtain subscription data, corresponding to the subscription data type, of the first terminal. After receiving the identifier of the first terminal and the subscription data type, the UDM obtains the subscription data, corresponding to the subscription data type, of the first terminal. The subscription data type herein is used to indicate that the subscription data that needs to be obtained is the information about the network slice that is accessible by the first terminal and a type of an NF that is accessible by the first terminal and that is in the network slice. Therefore, the subscription data obtained by the UDM includes the information about the network slice that is accessible by the first terminal and the type of the NF that is accessible by the first terminal and that is in the network slice.

Operation 204: The UDM sends, to the NRF, the information about the network slice that is accessible by the first terminal and the type of the NF that is accessible by the first terminal and that is in the network slice. Correspondingly, the NRF may receive the information about the network slice that is accessible by the first terminal and the type of the NF that is accessible by the first terminal and that is in the network slice.

If the information, sent by the UDM to the NRF, about the network slice that is accessible by the first terminal includes the information about the first network slice sent by the first terminal in the foregoing operation 202, and the type of the NF that is accessible by the first terminal and that is in the network slice includes the type of the first NF sent by the first terminal in the foregoing operation 202, the NRF determines to allow the first terminal to access the network element that supports the type of the first NF and that is in the first network slice.

If the information, sent by the UDM to the NRF, about the network slice that is accessible by the first terminal does not include the information about the first network slice sent by the first terminal in the foregoing operation 202, or if the information, sent by the UDM to the NRF, about the network slice that is accessible by the first terminal includes the information about the first network slice sent by the first terminal in the foregoing operation 202, but the type of the NF that is accessible by the first terminal and that is in the network slice does not include the type of the first NF sent by the first terminal in the foregoing operation 202, the NRF determines not to allow the first terminal to access the network element that supports the type of the first NF and that is in the first network slice.

For example, the information about the first network slice and the type of the first NF that are sent by the first terminal in the foregoing operation 202 are respectively the S-NSSAI 1 (used to identify the network slice 1) and the NF 1. The information about the network slice that is accessible by the first terminal and the type of the NF that is accessible by the first terminal and that is in the network slice that are returned by the UDM to the NRF are: (the S-NSSAI 1, the NF 1, the NF 2, and the NF 3) and (the S-NSSAI 2 (used to identify the network slice 2), the NF 1, and the NF 4). That is, the network slices that are accessible by the first terminal include the network slice 1 and the network slice 2, the types of the NF that is accessible by the first terminal and that is in the network slice 1 include the NF 1, the NF 2, and the NF 3, and the types of the NF that is accessible by the first terminal and that is in the network slice 2 include the NF 1 and the NF 4. The information about the network slice that is accessible by the first terminal includes the information about the first network slice (network slice 1), and the type of the NF that is accessible by the first terminal and that is in the network slice includes the type of the first NF (NF 1). Therefore, the NRF determines to allow the first terminal to access the NF 1 in the network slice 1.

For another example, the information about the first network slice and the type of the first NF that are sent by the first terminal in the foregoing operation 202 are respectively the S-NSSAI 1 and the NF 1. The information about the network slice that is accessible by the first terminal and the type of the NF that is accessible by the first terminal and that is in the network slice that are returned by the UDM to the NRF are: (the S-NSSAI 1, the NF 2, and the NF 3) and (the S-NSSAI 2, the NF 1, and the NF 4). That is, the network slices that are accessible by the first terminal include the network slice 1 and the network slice 2, the types of the NF that is accessible by the first terminal and that is in the network slice 1 include the NF 2 and the NF 3, and the types of the NF that is accessible by the first terminal and that is in the network slice 2 include the NF 1 and the NF 4. The information about the network slice that is accessible by the first terminal includes the information about the first network slice (network slice 1), but the type of the NF that is accessible by the first terminal and that is in the network slice does not include the type of the first NF (NF 1). Therefore, the NRF determines not to allow the first terminal to access the NF 1 in the network slice 1.

For another example, the information about the first network slice and the type of the first NF that are sent by the first terminal in the foregoing operation 202 are respectively the S-NSSAI 1 and the NF 1. The information about the network slice that is accessible by the first terminal and the type of the NF that is accessible by the first terminal and that is in the network slice that are returned by the UDM to the NRF are: (the S-NSSAI 3 (used to identify the network slice 3), the NF 2, and the NF 3) and (the S-NSSAI 2, the NF 1, and the NF 4). That is, the network slices that are accessible by the first terminal include the network slice 3 and the network slice 2, the types of the NF that is accessible by the first terminal and that is in the network slice 3 include the NF 2 and the NF 3, and the types of the NF that is accessible by the first terminal and that is in the network slice 2 include the NF 1, and the NF 4. The information about the network slice that is accessible by the first terminal does not include the information about the first network slice (network slice 1). Therefore, the NRF determines not to allow the first terminal to access the NF 1 in the network slice 1.

Therefore, in the foregoing first implementation or second implementation, the NRF can determine whether to allow the first terminal to access the network element that supports the type of the first NF and that is in the first network slice.

It should be noted that, the foregoing operation 203 and operation 204 are optional operations. When the foregoing first implementation is used, the foregoing operation 203 and operation 204 are not performed. When the foregoing second implementation is used, the foregoing operation 203 and operation 204 are performed.

Operation 206: The NRF obtains the address information of the first network element, where the first network element is the network element that supports the type of the first NF and that is in the first network slice.

Table 1 is used as an example. If information about the first network element includes the S-NSSAI 1, and the type of the first NF is the NF1, obtained address information of a plurality of first network elements is the IP1 and the IP7 respectively.

Operation 207: The NRF sends the address information of the first network element to the first terminal, and correspondingly, the first terminal may receive the address information of the first network element.

It should be noted that, if the NRF obtains IP addresses of a plurality of first network elements, for example, obtains the IP1 and the IP7, the NRF may select either of the IP1 and the IP7 and send the selected IP to the first terminal, or send both the IP1 and the IP7 to the first terminal, and the first terminal performs further selection.

According to the foregoing method, the address information of the network element that supports the type of the first NF and that is in the first network slice is returned to the first terminal, where the first terminal requests to access the network element, so that the first terminal can access the network element.

Optionally, the method further includes the following step.

S208: The first terminal initiates a registration procedure to the first network element based on the address information of the first network element.

By initiating the registration procedure, the first terminal and the first network element may interact with each other and execute a related service. For example, when the first network element is an LMF network element, the first terminal may perform a positioning service operation of the first terminal with the LMF network element.

Figure 3:
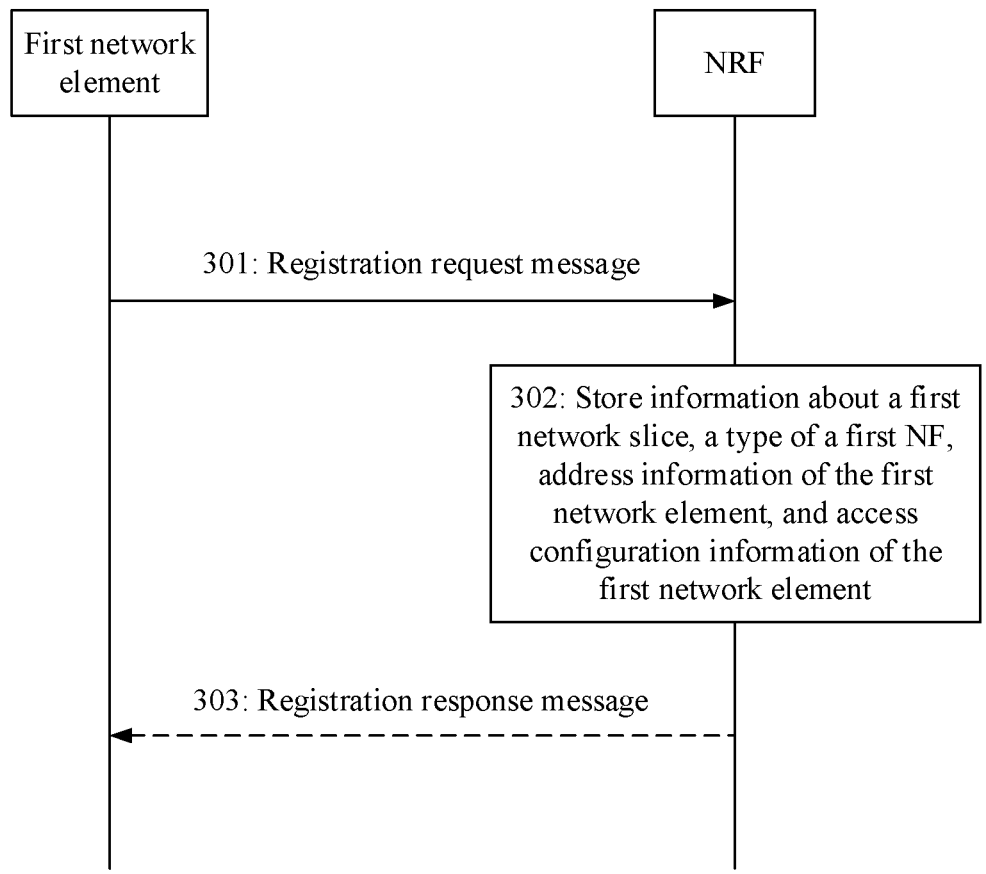
FIG. 3 is a flowchart of a registration method according to an embodiment of the application.

FIG. 3 shows a registration method according to an embodiment of the application. The method includes the following operations.

Operation 301: A first network element sends a registration request message to an NRF, where the registration request message includes information about a first network slice, a type of a first NF, address information of the first network element, and access configuration information of the first network element. Correspondingly, the NRF may receive the registration request message.

The registration request message is used to request to register related information of the first network element with the NRF. The related information of the first network element includes the information about the first network slice, the type of the first NF, the address information of the first network element, and the access configuration information of the first network element. Herein, the first network element may also be referred to as a network element that supports the type of the first NF and that is in the first network slice. The information about the first network slice includes network slice selection assistance information. For example, the network slice selection assistance information may be S-NSSAI. The S-NSSAI is used to identify a network slice. The type of the first NF is used to indicate a type of the first network element. The address information of the first network element is used to indicate an access address of the first network element. The access configuration information of the first network element is used to indicate whether the first network element is allowed to be accessed by a terminal. The first network element herein may also be referred to as the network element that supports the type of the first NF and that is in the first network slice.

For example, the first network element is an SMF network element. If the SMF network element belongs to a network slice 1, identification information of the network slice 1 is S-NSSAI 1, address information of the SMF network element is an IP 7, the SMF network element in the network slice 1 is allowed to be accessed by the terminal, the registration request message in the foregoing operation 301 includes (the S-NSSAI 1, an SMF, the IP 7, and being allowed to be accessed by the terminal).

Operation 302: The NRF stores the information about the first network slice, the type of the first NF, the address information of the first network element, and the access configuration information of the first network element.

For example, the NRF stores, to a local storage unit or a local memory, the information about the first network slice, the type of the first NF, the address information of the first network element, and the access configuration information of the first network element. In this way, the related information of the first network element is registered.

Optionally, the method may further include the following step.

Operation 303: The NRF sends a registration response message to the first network element. Correspondingly, the first network element may receive the registration response message.

When the NRF succeeds in storing the information about the first network slice, the type of the first NF, the address information of the first network element, and the access configuration information of the first network element, the NRF notifies, by using the registration response message, the first network element that the registration succeeds.

When the NRF fails in storing the information about the first network slice, the type of the first NF, the address information of the first network element, and the access configuration information of the first network element, the NRF notifies, by using the registration response message, the first network element that the registration fails.

According to the foregoing method, the related information of the first network element can be registered with the NRF, so that the related information of the first network element can be used subsequently.

The foregoing mainly describes the solutions provided in the application from a perspective of interaction between network elements. It may be understood that the network elements include corresponding hardware structures and/or software modules for performing the foregoing functions. One of ordinary skill in the art should easily be aware that, in combination with the examples described in embodiments disclosed in the specification, units, algorithms steps may be implemented by hardware or a combination of hardware and computer software in an embodiment of the invention. Whether a function is performed by hardware or hardware driven by computer software depends on particular applications and design constraints of the technical solutions. One of ordinary skill in the art may use different methods to implement the described functions for each particular application, but it should not be considered that the implementation goes beyond the scope of embodiments of the invention.

Figure 4:
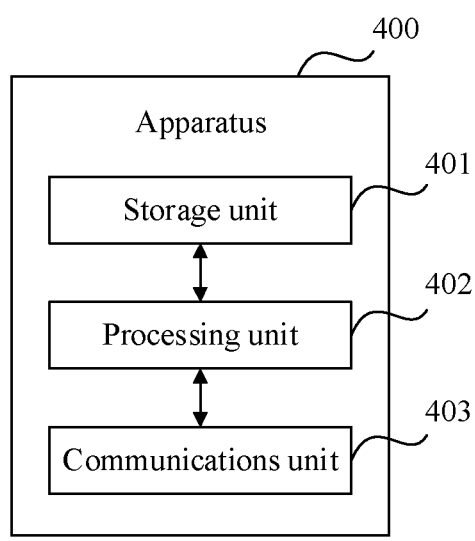
FIG. 4 is a schematic diagram of an apparatus according to an embodiment of the application.

When an integrated unit is used, FIG. 4 is an example block diagram of an apparatus in an embodiment of the application. The apparatus 400 may exist in a form of software, may be a terminal, or may be a chip in a terminal. The apparatus 400 includes a processing unit 402 and a communications unit 403. In an embodiment, the communications unit 403 may include a receiving unit and a sending unit. The processing unit 402 is configured to control and manage actions of the apparatus 400. For example, the processing unit 402 is configured to support the apparatus 400 in performing operation 201 in FIG. 2. The communications unit 403 is configured to support the apparatus 400 in communicating with another network entity (for example, a DHCP server, a network repository network element, or a first network element). For example, the communications unit 403 is configured to support the apparatus 400 in performing operation 202, operation 207, and operation 208 in FIG. 2. The apparatus 400 may further include a storage unit 401 configured to store program code and data of the apparatus 400.

In an embodiment, when the communications unit includes the sending unit and the receiving unit, the processing unit is configured to determine that a network element that supports a type of a first network function NF and that is in a first network slice needs to be accessed. The sending unit is configured to send the type of the first NF and the information about the first network slice to the network repository network element, to obtain address information of the network element that supports the type of the first NF and that is in the first network slice. The receiving unit is configured to receive address information of the first network element from the network repository network element. The first network element is the network element that supports the type of the first NF and that is in the first network slice.

In an embodiment, the information about the first network slice includes network slice selection assistance information.

In an embodiment, the processing unit is further configured to initiate a registration procedure based on the address information of the first network element.

In an embodiment, the sending unit is further configured to send a type of a network function repository function NRF to the dynamic host configuration protocol DHCP server, to obtain a network element that supports the type of the NRF. The receiving unit is further configured to receive address information of the network repository network element from the DHCP server. The sending unit is configured to send the type of the first NF and the information about the first network slice to the network repository network element based on the address information of the network repository network element.

In an embodiment, the sending unit is configured to send the type of the NRF and the information about the first network slice to the DHCP server, to obtain the network element that supports the type of the NRF and that is in the first network slice.

The processing unit 402 may be a processor or a controller, for example, may be a general purpose central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processing unit 402 may implement or execute various example logical blocks, modules, and circuits described with reference to content disclosed in embodiments of the invention. The processor may be a combination of processors implementing a computing function, for example, a combination of one or more microprocessors, or a combination of the DSP and a microprocessor. The communications unit 403 may be a communications interface, a transceiver, a transceiver circuit, or the like. The storage unit 401 may be a memory.

Figure 5:
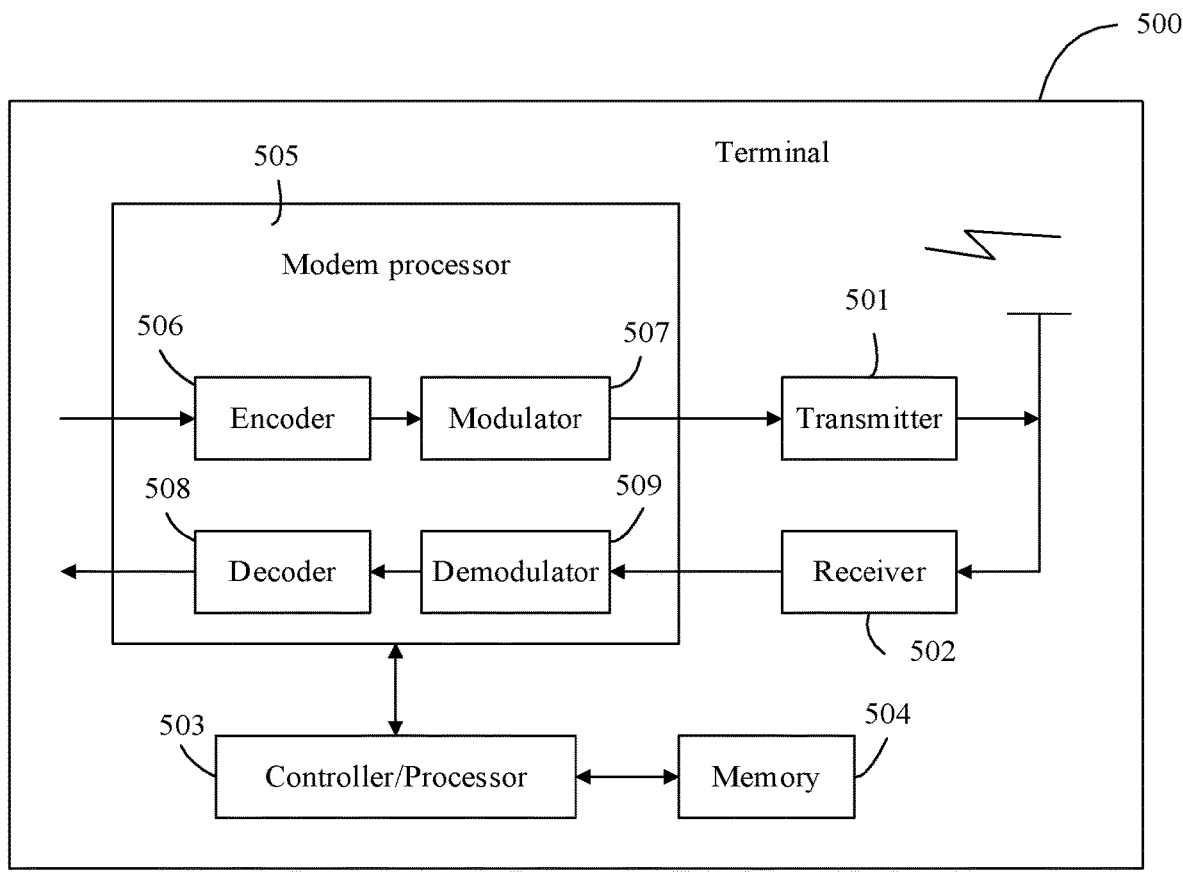
FIG. 5 is a schematic diagram of a terminal according to an embodiment of the application.

When the processing unit 402 is a processor, the communications unit 403 includes a transmitter and a receiver, and the storage unit 401 is a memory, the apparatus 400 in an embodiment of the application may be a terminal shown in FIG. 5.

FIG. 5 is a simplified schematic diagram of a possible design structure of a terminal in an embodiment of the invention. A terminal 500 includes a transmitter 501, a receiver 502, and a processor 503. The processor 503 may also be a controller, and is represented as the "controller/processor 503" in FIG. 5. Optionally, the terminal 500 may further include a modem processor 505. The modem processor 505 may include an encoder 506, a modulator 507, a decoder 508, and a demodulator 509.

In an example, the transmitter 501 adjusts (for example, analog converts, filters, amplifies, and up-converts) an output sample and generates an uplink signal. The uplink signal is transmitted to the DHCP server, the NRF, or the first network element in the foregoing embodiments through an antenna. The receiver 502 adjusts (for example, filters, amplifies, down-converts, and digitizes) a signal received from the antenna and provides an input sample. In the modem processor 505, the encoder 506 receives service data and a signaling message that are sent over an uplink, and processes (for example, formats, encodes, and interleaves) the service data and the signaling message. The modulator 507 further processes (for example, performs symbol mapping and modulates) encoded service data and an encoded signaling message and provides the output sample. The demodulator 509 processes (for example, demodulates) the input sample and provides symbol estimation. The decoder 508 processes (for example, de-interleaves and decodes) the symbol estimation and provides decoded data and a decoded signaling message that are to be sent to the terminal 500. The encoder 506, the modulator 507, the demodulator 509, and the decoder 508 may be implemented by the combined modem processor 505. The units perform processing based on a radio access technology used in a radio access network. It should be noted that when the terminal 500 does not include the modem processor 505, the foregoing functions of the modem processor 505 may alternatively be performed by the processor 503.

The processor 503 controls and manages actions of the terminal 500, and is configured to perform processing processes performed by the first terminal according to the foregoing embodiments of the invention. For example, the processor 503 is further configured to perform the processing processes of the first terminal according to the method shown in FIG. 2 and/or another process of the technical solutions described in the application.

Further, the terminal 500 may further include a memory 504, and the memory 504 is configured to store program code and data of the terminal 500.

Figure 6:
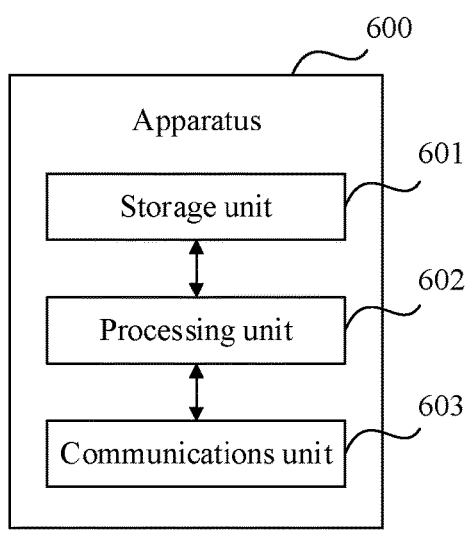
FIG. 6 is a schematic diagram of another apparatus according to an embodiment of the application.

When an integrated unit is used, FIG. 6 is an example block diagram of an apparatus in an embodiment of the application. The apparatus 600 may be in a form of software, may be a network repository network element or a first network element, or may further be a chip in a network repository network element or a chip in a first network element. The apparatus 600 includes a processing unit 602 and a communications unit 603. In an embodiment, the communications unit 603 may include a receiving unit and a sending unit. The processing unit 602 is configured to control and manage actions of the apparatus 600. The communications unit 603 is configured to support the apparatus 600 in communicating with another network entity (for example, a terminal or a data management network element). The apparatus 600 may further include a storage unit 601 configured to store program code and data of the apparatus 600.

The processing unit 602 may be a processor or a controller, such as may be a CPU, a general purpose processor, a DSP, an ASIC, an FPGA, or another programmable logic device, a transistor logic device, a hardware component, or any combination thereof. The processing unit 602 may implement or execute various example logical blocks, modules, and circuits described with reference to content disclosed in the application. Alternatively, the processor may be a combination of processors implementing a computing function, for example, a combination of one or more microprocessors, or a combination of the DSP and a microprocessor. The communications unit 603 may be a communications interface, a transceiver, a transceiver circuit, or the like. The communications interface is a general term. In an embodiment, the communications interface may include a plurality of interfaces. For example, when the apparatus 600 is a network repository network element, the communications interface may include an interface between the network repository network element and the terminal, an interface between the network repository network element and the data management network element, and/or another interface. For example, when the apparatus 600 is a first network element, the communications interface may include an interface between the first network element and the terminal, an interface between the first network element and a network repository network element, and/or another interface. The storage unit 601 may be a memory.

When the apparatus 600 is the foregoing network repository network element, the processing unit 602 may support the apparatus 600 in performing actions of the network repository network element in the foregoing examples of the methods. For example, the processing unit 602 is configured to support the apparatus 600 in performing operation 205 and operation 206 in FIG. 2, and performing operation 303 in FIG. 3. The communications unit 603 may support the apparatus 600 in communicating with the terminal and the data management network element. For example, the communications unit 603 is configured to support the apparatus 600 in performing operation 202 to operation 204 and operation 207 in FIG. 2, and performing operation 301 and operation 303 in FIG. 3.

In an embodiment, when the apparatus 600 is the foregoing network repository network element, and the communications unit 603 includes the sending unit and the receiving unit, in an embodiment, the receiving unit is configured to receive a type of a first network function NF and information about a first network slice that are from a first terminal. The processing unit is configured to determine to allow the first terminal to access a network element that supports the type of the first NF and that is in the first network slice, and obtain address information of the first network element. The first network element is the network element that supports the type of the first NF and that is in the first network slice. The sending unit is configured to send the address information of the first network element to the first terminal.

In an embodiment, the sending unit is further configured to send an identifier of the first terminal and a subscription data type to a data management network element, to request to obtain subscription data, corresponding to the subscription data type, of the first terminal. The receiving unit is further configured to receive the subscription data of the first terminal from the data management network element. The subscription data includes information about a network slice that is accessible by the first terminal and a type of an NF that is accessible by the first terminal and that is in the network slice. The processing unit is configured to: if the information about the network slice that is accessible by the first terminal includes the information about the first network slice, and the type of the NF that is accessible by the first terminal and that is in the network slice includes the type of the first NF, determine that the first terminal is allowed to access the network element that supports the type of the first NF and that is in the first network slice.

In an embodiment, the processing unit is configured to: determine, based on preset policy information, the type of the NF that is accessible by the first terminal and that is in the network slice; and if the type of the NF that is accessible by the first terminal and that is in the network slice includes the type of the first NF, determine that the first terminal is allowed to access the network element that supports the type of the first NF and that is in the first network slice.

In another embodiment, the processing unit is configured to determine, based on preset policy information, that the first NF in the first network slice is allowed to be accessed by the first terminal.

In an embodiment, the information about the first network slice includes network slice selection assistance information.

In an embodiment, the receiving unit is further configured to receive a registration request message from the first network element. The registration request message includes the type of the first NF, the information about the first network slice, the address information of the first network element, and access configuration information of the first network element. The access configuration information is used to indicate whether the first network element is allowed to be accessed by the first terminal. The processing unit is further configured to store, to the storage unit, the type of the first NF, the information about the first network slice, the address information of the first network element, and the access configuration information of the first network element.

In another embodiment, the receiving unit is configured to receive a registration request message from the first network element. The registration request message includes information about a first network slice, a type of a first NF, address information of the first network element, and access configuration information of the first network element. The processing unit is configured to store, to the storage unit, the information about the first network slice, the type of the first NF, the address information of the first network element, and the access configuration information of the first network element.

In an embodiment, the sending unit may further send a registration response message to the first network element. The registration response message is used to notify the first network element whether the registration succeeds or fails.

When the apparatus 600 is the foregoing first network element, the communications unit 603 may support the apparatus 600 in communicating with the terminal and the network repository network element. For example, the communications unit 603 is configured to support the apparatus 600 in performing operation 208 in FIG. 2, and performing operation 301 and operation 303 in FIG. 3.

In an embodiment, when the apparatus 600 is the foregoing first network element, and the communications unit 603 includes the sending unit and the receiving unit, the sending unit is configured to send a registration request message to the network repository network element. The registration request message includes information about a first network slice, a type of a first NF, address information of the first network element, and access configuration information of the first network element.

In an embodiment, the receiving unit is configured to receive a registration response message from the network repository network element. The registration response message is used to notify the first network element whether the registration succeeds or fails.

Figure 7:
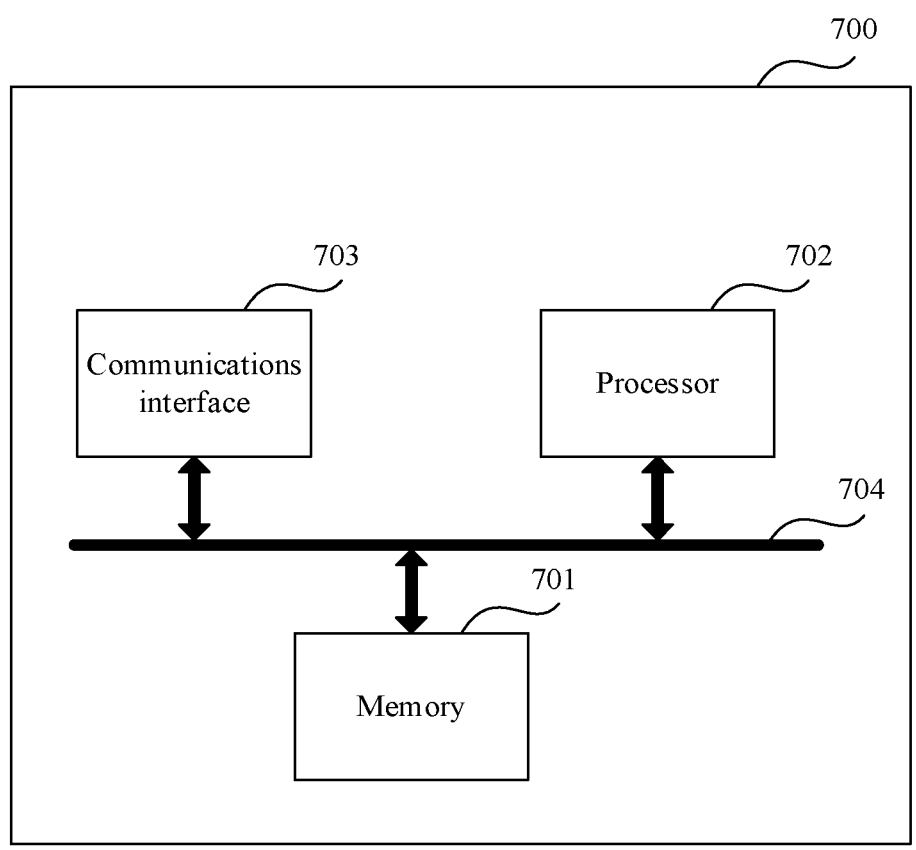
FIG. 7 is a schematic diagram of another apparatus according to an embodiment of the application.

FIG. 7 is a schematic diagram of an apparatus according to the application. The apparatus may be the foregoing network repository network element or the foregoing first network element. The apparatus 700 includes a processor 702, a communications interface 703, and a memory 701. Optionally, the apparatus 700 may further include a bus 704. The communications interface 703, the processor 702, and the memory 701 may be connected to each other by a communications line 704. The communication line 704 may be a peripheral component interconnect (PCI) bus, an extended industry standard architecture (EISA) bus, or the like. The communications line 704 may be classified into an address bus, a data bus, a control bus, and the like. For ease of representation, only one thick line is used to represent the bus in FIG. 7, but this does not mean that there is only one bus or only one type of bus.

The processor 702 may be a CPU, a microprocessor, an ASIC, or one or more integrated circuits configured to control program execution in the solutions of the application.

The communications interface 703 may be any apparatus like a transceiver, and is configured to communicate with another device or a communications network, such as Ethernet, a radio access network (RAN), a wireless local area network (WLAN), or a wired access network.

The memory 701 may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, or the like), a magnetic disk storage medium or another magnetic storage device, or any other medium capable of carrying or storing expected program code in a form of an instruction or a data structure and capable of being accessed by a computer. This is not limited thereto. The memory may exist independently, and is connected to the processor through the communications line 704. The memory may further be integrated with the processor.

The memory 701 is configured to store a computer-executable instruction for performing the solutions in the application, and the processor 702 controls execution of the computer-executable instruction. The processor 702 is configured to execute the computer-executable instruction stored in the memory 701, to implement the method for obtaining address information and the registration method provided in the foregoing embodiments of the application.

Optionally, the computer-executable instruction in an embodiment of the application may also be referred to as application program code, and this is not limited in an embodiment of the application.

All or some of the foregoing embodiments may be implemented by using software, hardware, firmware, or any combination thereof. When software is used to implement embodiments, embodiments may be implemented completely or partially in a form of a computer program product. The computer program product includes one or more computer instructions. When the computer program instructions are loaded and executed on a computer, the procedure or functions according to embodiments of the application are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), or the like.

The various illustrative logical units and circuits described in embodiments of the application may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Operations of the methods or algorithms described in embodiments of the application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in a terminal device. Alternatively, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide operations for implementing a specified function in one or more processes in the flowcharts and/or in one or more blocks in the block diagrams.

Although the application is described with reference to specific features and embodiments thereof, it is clear that various modifications and combinations may be made to them without departing from the spirit and scope of the application. Correspondingly, the specification and accompanying drawings are merely example description of the application defined by the accompanying claims, and is considered as any of or all modifications, variations, combinations or equivalents that cover the scope of the application. It is clear that one of ordinary skill in the art can make various modifications and variations to the application without departing from the spirit and scope of the application. The application is intended to cover these modifications and variations of the application provided that they fall within the scope of the claims of the application and their equivalent technologies.

What is claimed is:

1. An address information obtaining method, comprising:
   determining that a first network element that supports a type of a first network function (NF) and is in a first network slice needs to be accessed;
   sending a type of a network repository function (NRF) corresponding to the first NF to a dynamic host configuration protocol (DHCP) server;
   receiving address information of a network repository network element from the DHCP server;
   sending to the network repository network element and based on the address information of the network repository network element, the type of the first NF and information about the first network slice to obtain address information of the first network element that supports the type of the first NF and is in the first network slice; and
   receiving from the network repository network element, the address information of the first network element, wherein the first network element supports the type of the first NF and that is in the first network slice.

2. The method according to claim 1, wherein the information about the first network slice comprises network slice selection assistance information of the first network slice.

3. The method according to claim 1, further comprising:
   initiating a registration procedure based on the address information of the first network element.

4. The method according to claim 1, wherein the sending the type of the NRF to the DHCP server comprises:
   sending the type of the NRF and the information about the first network slice to the DHCP server to obtain the first network element that supports the type of the NRF and that is in the first network slice.

5. An address information obtaining method, comprising:
   receiving, by a network repository network element from a first terminal utilizing address information obtained from a dynamic host configuration protocol (DHCP) server, a type of a first network function (NF) and information about a first network slice;
   determining, by the network repository network element, that the first terminal is allowed to access a first network element that supports the type of the first NF and is in the first network slice;
   obtaining, by the network repository network element, address information of the first network element, wherein the first network element supports the type of the first NF and is in the first network slice; and
   sending, by the network repository network element to the first terminal, the address information of the first network element.

6. The method according to claim 5, wherein the determining, by the network repository network element, that the first terminal is allowed to access the first network element comprises:
   sending, by the network repository network element, an identifier of the first terminal and a subscription data type to a data management network element to obtain subscription data corresponding to the subscription data type of the first terminal;
   receiving, by the network repository network element, the subscription data of the first terminal from the data management network element, wherein the subscription data comprises information about a network slice that is accessible by the first terminal and a type of an NF that is accessible by the first terminal and that is in the network slice; and
   if the information about the network slice that is accessible by the first terminal comprises the information about the first network slice, and the type of the NF that is accessible by the first terminal and that is in the network slice comprises the type of the first NF, determining, by the network repository network element that the first terminal is allowed to access the first network element that supports the type of the first NF and that is in the first network slice.

7. The method according to claim 5, wherein the determining, by the network repository network element, that the first terminal is allowed to access the first network element that supports the type of the first NF and that is in the first network slice comprises:
   determining, by the network repository network element, based on preset policy information that the first NF in the first network slice is allowed to be accessed by the first terminal.

8. The method according to claim 5, wherein the information about the first network slice comprises network slice selection assistance information of the first network slice.

9. The method according to claim 5, further comprising:
   receiving, by the network repository network element, a registration request message from the first network element, wherein the registration request message comprises the type of the first NF, the information about the first network slice, the address information of the first network element, and access configuration information of the first network element, and wherein the access configuration information indicates whether the first network element is allowed to be accessed by the first terminal; and
   storing, by the network repository network element, the type of the first NF, the information about the first network slice, the address information of the first network element, and the access configuration information of the first network element.

10. An apparatus, comprising:
    a processor; and
    a memory coupled to the processor and having program instructions stored thereon which, when executed by the processor, cause the processor to:
    determine that a first network element that supports a type of a first network function (NF) and is in a first network slice needs to be accessed;
    send a type of a network repository function (NRF) corresponding to the first NF to a dynamic host configuration protocol (DHCP) server;
    receive address information of a network repository network element from the DHCP server;
    send, based on the address information of the network repository network element, the type of the first NF and information about the first network slice to the network repository network element to obtain address information of the first network element that supports the type of the first NF and is in the first network slice; and
    receive address information of the first network element from the network repository network element, wherein the first network element supports the type of the first NF and is in the first network slice.

11. The apparatus according to claim 10, wherein the information about the first network slice comprises network slice selection assistance information of the first network slice.

12. The apparatus according to claim 10, wherein the instructions cause the processor to initiate a registration procedure based on the address information of the first network element.

13. The apparatus according to claim 10, wherein the instructions cause the processor to send the type of the NRF and the information about the first network slice to the DHCP server to obtain the first network element that supports the type of the NRF and that is in the first network slice.

14. A communications system comprising:
a network repository network element; and
a terminal comprising a first processor configured to:
  determine that a first network element that supports a type of a first network function (NF) and is in a first network slice needs to be accessed,
  send a type of a network repository function (NRF) corresponding to the first NF to a dynamic host configuration protocol (DHCP) server,
  receive address information of the network repository network element from the DHCP server,
  send to the network repository network element, the type of the first NF and information about the first network slice to obtain address information of the first network element that supports the type of the first NF and is in the first network slice, and
  receive from the network repository network element, the address information of the first network element, wherein the first network element supports the type of the first NF and that is in the first network slice,
wherein the network repository network element comprises a second processor configured to:
  receive, from the terminal, the type of the first NF and information about the first network slice,
  determine that the terminal is allowed to access the first network element that supports the type of the first NF and is in the first network slice,
  obtain the address information of the first network element that supports the type of the first NF and is in the first network slice, and
  send the address information of the first network element to the terminal.

15. The communications system according to claim 14, wherein the information about the first network slice comprises network slice selection assistance information of the first network slice, and wherein the first processor is further configured to:
  initiate a registration procedure based on the address information of the first network element.

16. The communications system according to claim 14, wherein the second processor is further configured to:
  send an identifier of the terminal and a subscription data type to a data management network element to obtain subscription data corresponding to the subscription data type of the terminal;
  receive the subscription data of the terminal from the data management network element, wherein the subscription data comprises information about a network slice that is accessible by the terminal and a type of an NF that is accessible by the terminal and that is in the network slice; and
  if the information about the network slice that is accessible by the terminal comprises the information about the first network slice, and the type of the NF that is accessible by the terminal and that is in the network slice comprises the type of the first NF, determine that the terminal is allowed to access the first network element that supports the type of the first NF and that is in the first network slice.

17. The communications system according to claim 14, wherein the second processor is further configured to:
  receive a registration request message from the first network element, wherein the registration request message comprises the type of the first NF, the information about the first network slice, the address information of the first network element, and access configuration information of the first network element, and wherein the access configuration information indicates whether the first network element is allowed to be accessed by the terminal; and
  store the type of the first NF, the information about the first network slice, the address information of the first network element, and the access configuration information of the first network element.

* * * * *